J. RUNSER.
MEAT CUTTER.
APPLICATION FILED JULY 25, 1911.
1,065,843.
Patented June 24, 1913.
4 SHEETS—SHEET 2.
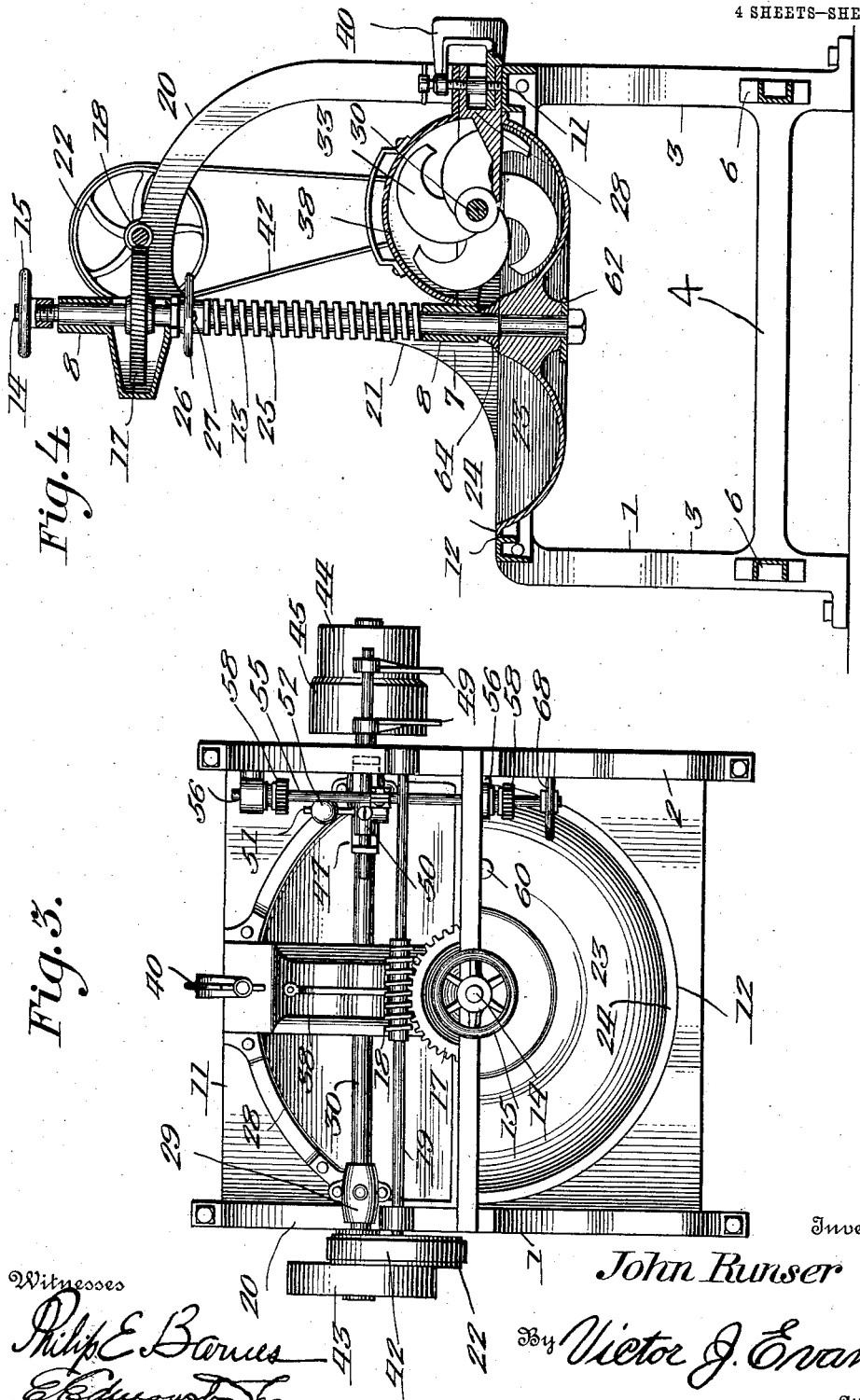

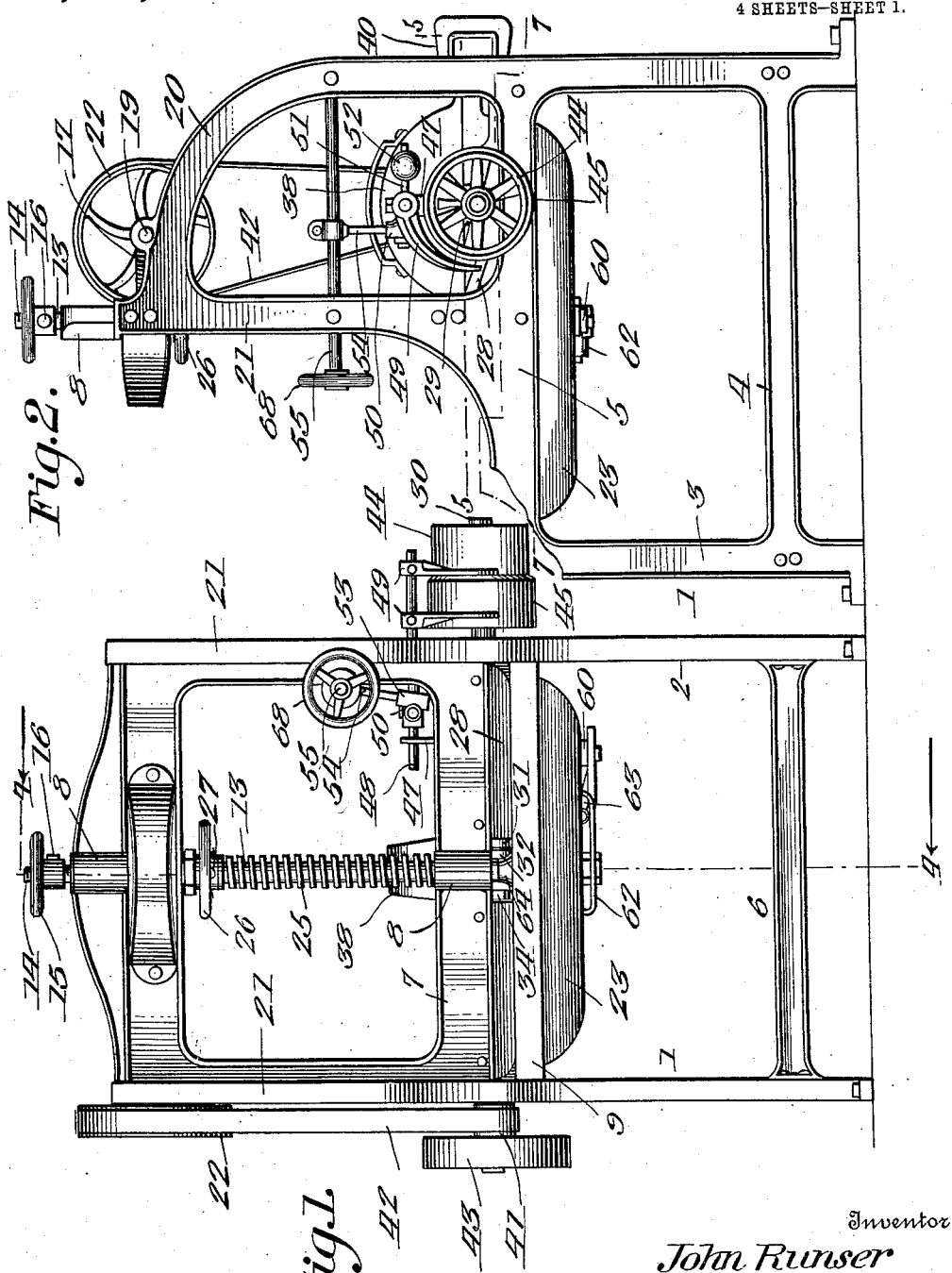

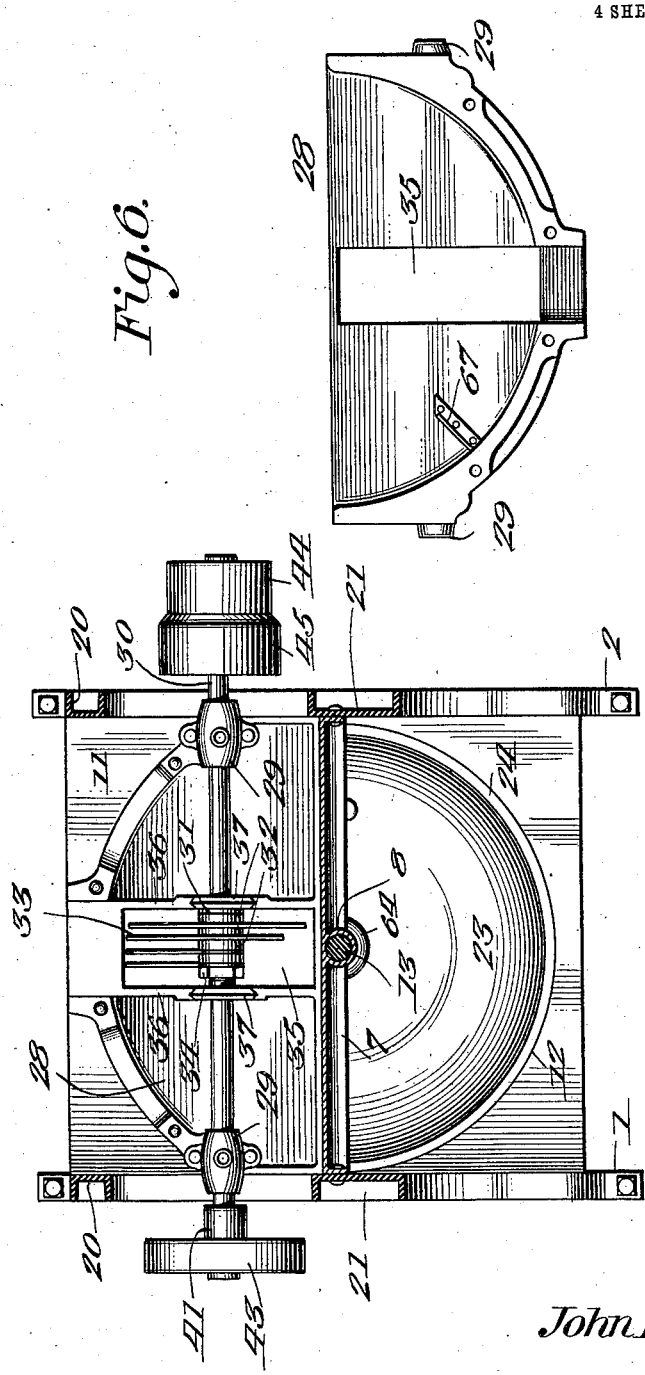

J. RUNSER.
MEAT CUTTER.
APPLICATION FILED JULY 25, 1911.
1,065,843.
Patented June 24, 1913.
4 SHEETS—SHEET 4.
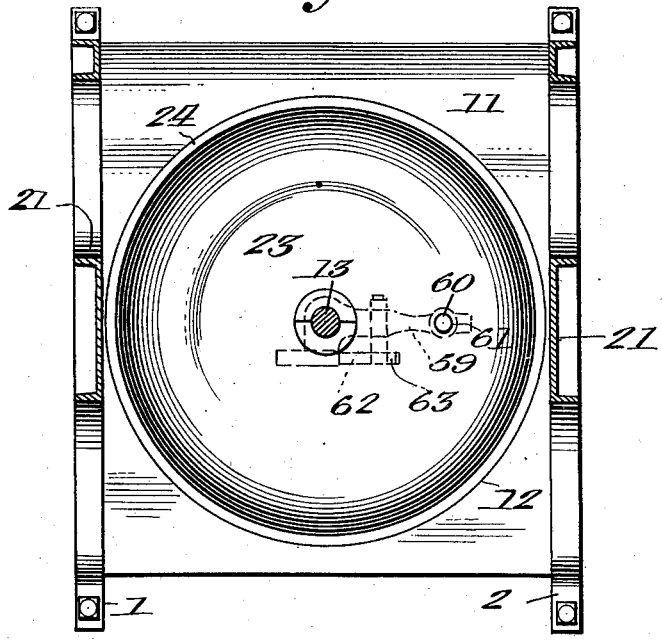
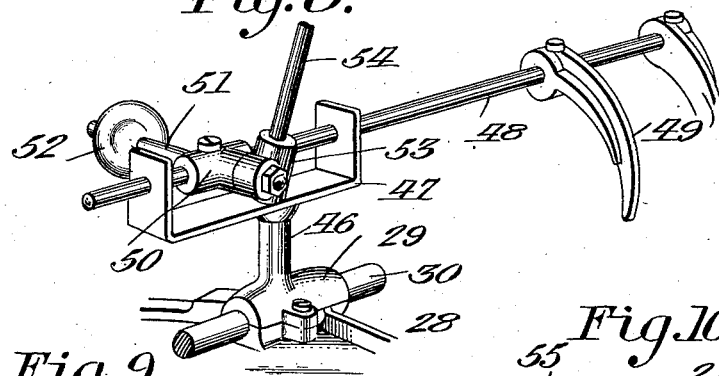
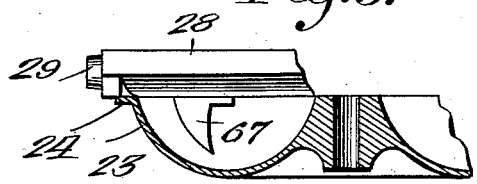
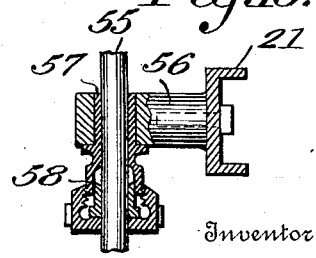
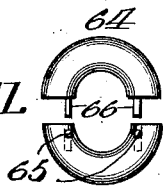
Inventor
John Runser
By Victor J. Evans
Attorney
Witnesses

UNITED STATES PATENT OFFICE.

JOHN RUNSER, OF FORT WAYNE, INDIANA, ASSIGNOR OF ONE-FOURTH TO LOUIS E. AURENTZ AND ONE-FOURTH TO CARL H. PIERSON, BOTH OF FORT WAYNE, INDIANA.

MEAT-CUTTER.

1,065,843.  Specification of Letters Patent.  Patented June 24, 1913.

Application filed July 25, 1911. Serial No. 640,397.

*To all whom it may concern:*

Be it known that I, JOHN RUNSER, a citizen of the United States, residing at Fort Wayne, in the county of Allen and State of Indiana, have invented new and useful Improvements in Meat-Cutters, of which the following is a specification.

This invention relates to meat cutters and the object of the invention is to provide a novel machine wherein the parts are few and simple in construction and wherein the operation of cutting the meat into small bits is accomplished with little delay.

A further object of the invention is the provision of a machine of this character having a rotating bowl for carrying the meat and a plurality of knives rotating at right angles to the bowl and independently mounted so that they may be readily removed for cleaning or other repairs.

A still further object of the invention is the provision, in a machine of this character, of a rotating meat supporting bowl, a means for holding the bowl constantly in proper relation to the cutting knives and for taking up any wear thereon in a convenient manner so that the interruption to the operation of the machine will only be of comparatively short duration.

Further objects of the invention will appear as the following specific description is read in connection with the accompanying drawings, which form a part of this application, and in which:—

Figure 1 is a front elevation. Fig. 2 is a side elevation. Fig. 3 is a top plan view. Fig. 4 is a section on the line 4—4 of Fig. 1. Fig. 5 is a section on the line 5—5 of Fig. 2. Fig. 6 is a bottom plan view of the knife mounting plate. Fig. 7 is a detail horizontal section on the line 7—7 of Fig. 2. Fig. 8 is a fragmentary perspective view of the belt shifter on an enlarged scale. Fig. 9 is a fragmentary section view of the bowl and mounting plate in an operative position. Fig. 10 is a view of the flanged bushing and stuffing box. Fig. 11 is a view of the cone shaped collar showing it made in sections.

Referring more particularly to the drawings, 1 and 2 represent the side frames of the machine which are constructed by providing legs 3 and cross bars 4 and 5. The side frames are connected together by means of cross bars 6 and a screw mounting frame 7 which is substantially rectangular in outline and has secured thereto suitable bearings 8, for a purpose to be hereinafter described. The side members are also connected together by front and back plates 9 to which and to the side bars 5 is connected a supporting plate 11 arranged in horizontal position and having an aperture 12 in the center thereof.

Journaled in the bearings 8 is a shaft 13 having a reduced and threaded upper end 14 upon which an adjusting wheel 15 is threaded and secured in adjusted position by means of a set screw 16. The upper end of the shaft carries a worm wheel 17 which operates through a slot in the upper cross bar of the frame 7 and is driven by a worm 18 carried upon a counter shaft 19 journaled in bearings upon the bowed side pieces 20 which extend upwardly from the cross bars 5 to the vertical upright 21 to which the frame 7 is bolted. This counter shaft 19 carries a pulley 22, the connection of which with the driving shaft will be hereinafter described. The shaft 13 passes through the bearing 8 on the lower cross bar of the frame and has secured to its lower end a meat receiving bowl 23 which rotates with the shaft and is provided with an annular outstanding flange 24 adapted to engage the walls of the opening or aperture 12.

In order to adjust the position of the bowl and maintain the same in engagement with the supporting plate 11, a spring 25 surrounds the shaft 13 between the bearing 8 and the lower cross bar of the frame 7 and an adjustable collar 26 is mounted upon the shaft and held in adjusted position thereon by a set screw 27. When this spring becomes broken the wheel 15 may be adjusted upon the shaft 13 so as to bring the lower end of its hub against the bearing 8 upon the upper cross bar of the frame 7, thus, while a new spring is being made ready to be placed upon the shaft, the wheel 15 will operate to keep the bowl in proper position and the operation of the machine may thus be continued. The wheel may be used entirely, if found to be desirable, but it is thought that the spring will be the preferable form because it automatically takes up wear caused by the rotation of the bowl.

Mounted upon the plate 11 in the rear of the cross bar of the frame 7 and secured thereto and also to the plate 11 is a cutter mounting plate 28 which is provided with a set of bearings 29, one on each side thereof, to receive the driving shaft 30. This driving shaft has a collar 31 keyed thereon intermediate its length and a plurality of loose collars 32 between which are clamped the simitar-shaped cutting knives 33. These knives are clamped between the cutters by means of a nut 34 threaded upon the shaft and operable within the bowl, as shown in Fig. 5.

The plate 28 has extending across the same from front to back an aperture 35 in which the knives 33 operate and upon opposite sides of the aperture suitable webs 36 are formed having semi-circular recesses whose walls are concaved, as shown, to receive one-half of the bearing cones 37. The opposite halves of the bearing cones are held in place by a cap or cover 38 which is also provided with semi-circular recesses having their walls concaved or recessed to receive the beveled edges of the cones. This cap is held in place by a suitable U-clamp 40.

One end of the shaft 30 is provided with a pipe pulley 41 of small diameter over which a belt 42 travels and connects the pulley 41 with the pulley 22, so that the worm 18 may be properly driven. At the same end of the shaft a relatively large pulley 43 is secured so that the machine may be driven at a comparatively low rate of speed for cutting meat used in blood pudding, head cheese or the like. The opposite end of the shaft has secured thereto the loose and fast pulleys 44 and 45, the belt upon which is adapted to be controlled by the shifter which will now be described.

Projecting vertically from the cap of one of the bearings 29 is an upright 46 having secured to its outer end a yoke 47 in the ends of which is slidably mounted a shifter shaft 48. This shifter shaft carries the belt contacting fingers 49 and a head 50 upon which there is mounted a laterally projecting threaded peg 51 upon which the balance ball 52 is threaded. This ball balances the weight of the fingers 49 and prevents binding of the shaft 48 in the bearing yoke 47. The head is also provided with a rod receiving sleeve 53 which is journaled upon an extension of the head and is adapted to loosely receive a rod 54 keyed to a transverse horizontal shaft 55. This latter shaft is journaled in arms 56 projecting outwardly at right angles to the upright 21 and bowed member 20 of the set frame 2. The shaft operates through flanged bushings 57 and secured to the flange of the bushing 57 is a stuffing box 58 which is adapted to bind upon the shaft 55 so that it will be frictionally held in operative position and prevent the shifter fingers and the shaft 48 from being accidentally moved from one pulley to the other (see Fig. 10).

Secured to the lower end of the shaft 13 below the bowl 23 is a pivoting arm 59 upon which is pivoted a valve 60 adapted to enter a hole 61 in the bottom part of the bowl (see Fig. 7). The valve is normally held in closed position by means of a spring 62 which bears upon an angular extension 63 of the valve so that the same may be held in either the closed or open position. This valve is provided so that blood or other liquid may be drawn off from the bowl when necessary.

Mounted upon the top of the bowl and surrounding the shaft 13 is a cone 64 which is constructed in separate halves and held together by a set screw 65 and the dowel pins 66.

In the operation of the device the meat is shoved across the table or supporting plate 11 in the front of the bowl and carried around to the knives where it is chopped into fine bits. The rotation of the bowl is continued until all the meat is chopped to the required degree of fineness and where the meat passes the knives it is turned over by a plow 67 secured to the underneath side of the mounting plate 28. Where all the meat has been properly treated the blood in the bowl may be let out through a hole 61 and the meat removed as it passes the front of the machine in the rotation of the bowl. To stop the machine the wheel 68 upon the shaft 55 is turned which moves the shaft 48 to the right and thus shifts the belt from the tight pulley 45 to the loose pulley 44.

Having thus described the invention, what I claim as new is:—

1. In combination, a frame, a supporting plate therein having an aperture, a shaft journaled in the frame, a bowl carried by the lower end of said shaft and operating in the aperture, a mounting plate carried by the frame, a spring surrounding said shaft and operating to automatically take up wear between the bowl and the mounting plate and to hold the bowl in engagement with said mounting plate, means for rotating the bowl, and a plurality of vertically rotating knives carried by the mounting plate and operating within the bowl.

2. In a device of the class described, the combination with a frame, of a supporting table carried thereby, a mounting plate secured upon the supporting table, a shaft journaled in the frame, a meat receiving bowl carried upon the shaft and having a portion extended through the supporting table and abutting the mounting plate, means for rotating the shaft and bowl, a spring surrounding said shaft and operating to automatically take up the wear between the mounting plate and bowl which supports the shaft and bowl, and auxiliary means carried by the shaft and adapted to coact with the frame to support the shaft and hold the latter in engagement with the mounting plate.

3. In a device of the class described, the combination with a frame, of an apertured supporting table mounted therein, a shaft journaled in the frame, a bowl carried by the lower end of said shaft and having a portion thereof extended through the aperture, a mounting plate secured on the top of the table and forming an abutment for the bowl, a spring encircling said shaft, an adjusting collar on the shaft for adjusting the tension of the spring, and a wheel threaded on the upper end of said shaft and adapted to support the same in the bowl when the spring becomes broken.

4. In a device of the class described, the combination with a frame having vertically disposed upright side portions and upwardly extending rear bowed portions connected with said side portions, a cross bar connecting said side portions, an apertured supporting table mounted within said frame, a shaft journaled in said cross bar, a bowl carried by said shaft and operating in said aperture, a mounting plate carried by said frame, a spring encircling said shaft, an adjustable collar mounted on the shaft below said cross bar, means for rotating the shaft, and an adjustable collar mounted on the shaft above said cross bar and adapted to be moved into engagement with the frame substantially as and for the purpose specified.

In testimony whereof I affix my signature in presence of two witnesses.

JOHN RUNSER.

Witnesses:
　WILLIAM WIEGMAN,
　MICHAEL JOSEPH HOFER.

Copies of this patent may be obtained for five cents each, by addressing the "Commissioner of Patents, Washington, D. C."